(No Model.)
H. HUTCHINS.
SEXTANT.
No. 354,602. Patented Dec. 21, 1886.
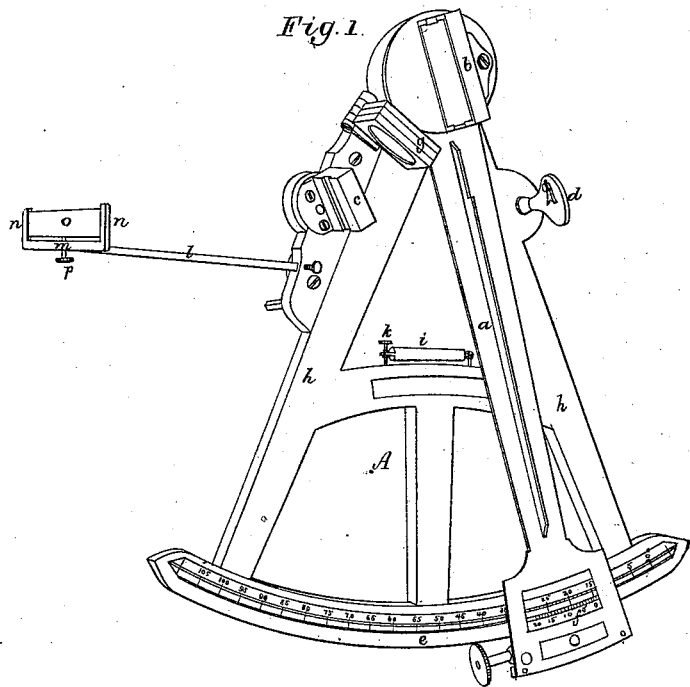
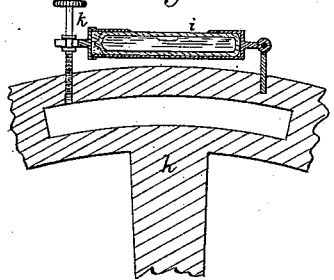
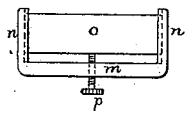
Witnesses.
S. N. Piper.
H. B. Torrey.
Inventor.
Herbert Hutchins.
by R. H. Eddy atty.

UNITED STATES PATENT OFFICE.

HERBERT HUTCHINS, OF SOUTH PENOBSCOT, MAINE.

SEXTANT.

SPECIFICATION forming part of Letters Patent No. 354,602, dated December 21, 1886.

Application filed June 24, 1886. Serial No. 206,082. (No model.)

*To all whom it may concern:*

Be it known that I, HERBERT HUTCHINS, of South Penobscot, in the county of Hancock, of the State of Maine, have invented a new and useful Improvement in Quadrants or Sextants; and I do hereby declare the same to be described in the following specification and represented in the accompanying drawings, of which—

Figure 1 is a perspective view of a mariner's quadrant provided with my invention, the nature of which is defined in the claims hereinafter presented. Fig. 2 is a longitudinal section taken through its level and the fixtures thereof for connecting such level with the frame of the quadrant. Fig. 3 is a front view of the foresight or artificial horizon, $o$, and its supports and adjusting-screw, to be described.

In Fig. 1, A denotes a quadrant of ordinary construction, of which $a$ is the pivoted arm or movable limb; $b$, its reflecting-mirror; $c$, the fixed mirror; $d$, the sight; $e$, the graduated arc; $f$, the vernier; $g$, the series of colored glasses, and $h$ the frame of the instrument.

The purpose of my invention is to enable the quadrant to be used in taking altitudes when the natural horizon is obscured or invisible.

In carrying out my said invention I combine with the frame $h$ a spirit-level, $i$, which I arrange directly over the arched cross-bar of the frame, such level being at one end pivoted to the frame and at the other provided with an adjusting-screw, $k$, for raising or lowering the level at one end of it, in order to effect its proper adjustment with reference to the horizon and the upper hole of the sight $d$—that is to say, when an observer is looking through the sight and the unsilvered part of the fixed mirror $c$ and at the horizon the level, in order to be adjusted, is to be moved or raised or lowered so as to cause the bubble of air to stand at the middle of the glass tube.

There may be to the frame, if desirable, a scale to mark the rise or fall of the level or indicate when it may be at the proper position. Furthermore, in carrying out my invention I extend from the frame of the quadrant somewhat below the fixed mirror or horizon-glass an arm or rod, $l$, about a quarter of an inch square in transverse section and five inches in length, such being at one end inserted in a socket and held therein by a clamp-screw. Fixed to the rod at its outer end is a cross-bar, $m$, provided at its end with two standards, $n$, grooved in their next adjacent sides to receive a rectangular plate of metal or other suitable material, $o$, which I usually provide with a thumb-screw, $p$, for adjusting it vertically within the standards, as occasion may require, in order to bring its upper edge to range with the hole of the sight and the horizon when the bubble of the level is at the middle of the glass tube. The adjustable plate $o$, I term the "artificial horizon," as it answers the purpose of the natural horizon when the bubble of the spirit-level is at the middle of its glass tube and the natural horizon is obscured so as to prevent it being seen by an observer.

In using the instrument a person with his eye at the sight-hole can easily see the spirit-level. In taking an altitude of the sun he has only to move the instrument so as to bring the bubble in the middle of the spirit-level, in which case the line of the upper edge of the artificial horizon and eye piece or sight will be horizontal, then by moving the arm so as to bring the reflected image upon the fixed mirror and into apparent coincidence with the artificial horizon, and at the same time keeping the air-bubble at the middle of the spirit-level, he will have the altitude denoted on the arc, as would be the case were he able to see the real horizon.

My invention is applicable to a sextant or octant as well as to a quadrant.

I do not claim a quadrant or other instrument of like character for taking altitudes provided not only with a spirit-level secured to the frame of the instrument, but also having a line drawn across the middle of the horizon-glass at right angles to the edge of the silvering thereof, all being as represented in the British Patent No. 1,258 for 1856. Nor do I claim a sextant having duplicate attached spirit-levels arranged in relation to each other, a horizon-glass, a reflector, and eye-piece, as described in the United States Patent No. 310,692.

Instead of a line drawn as aforesaid across the horizon-glass, I have such glass, as usual in quadrants, without any such line, and with the edge of its silvering parallel to the plane of the intrument, and I have projecting from the frame a bar, m, as described, provided with the plate or sight o, with its adjusting-screw p, whereby such plate becomes arranged in advance of and at a considerable distance from the said horizon-glass, the adjusting-screw serving to bring the upper edge of the sight in range with the horizon when the bubble of the spirit-level is at the middle of the glass thereof, the upper edge of the sight or plate being at a right angle to the plane of the instrument.

I claim—

1. The combination, with a quadrant or instrument of like nature for taking altitudes, of a spirit-level applied to the frame of the instrument, and of an arm projecting from such frame and provided with a sight, as described, and means of adjusting such sight, all being substantially and for use as set forth.

2. The combination, with a quadrant or instrument of like nature for taking altitudes, of a spirit-level applied to the frame of the instrument and provided with means of adjusting it, the said level, as set forth, with an arm projecting from such frame and provided with a sight, as described, arranged in advance of the horizon-glass, as specified.

3. The combination, with a quadrant or instrument of like nature for taking altitudes, provided with a spirit-level applied to the frame of the instrument and having means of adjusting it, the said level, as described, relatively to such frame, with an arm projecting from the frame, and of a sight sustained by said arm in advance of the horizon-glass, and having means of adjusting it, the said sight, upward or downward, the whole being substantially as described, so as to admit of the sight being adjusted relatively to the level, or the latter relatively to the sight, essentially as specified.

HERBERT HUTCHINS.

Witnesses:
A. C. HINCKLEY,
W. I. PARTRIDGE.